United States Patent [19]

Camilleri

[11] Patent Number: 4,722,648
[45] Date of Patent: Feb. 2, 1988

[54] ADJUSTABLE BACK CLIP

[75] Inventor: Charles F. Camilleri, St. Louis, Mo.

[73] Assignee: Lee-Rowan Company, St. Louis, Mo.

[21] Appl. No.: 926,574

[22] Filed: Nov. 4, 1986

Related U.S. Application Data

[63] Continuation-in-part of Ser. No. 783,158, Oct. 2, 1985, Pat. No. 4,699,936.

[51] Int. Cl.4 .......................... F16L 3/08; F16L 3/12
[52] U.S. Cl. .................................. 411/340; 248/250; 248/489; 24/543
[58] Field of Search ................... 24/543, 545; 211/187; 411/394, 38, 41, 57, 71, 72, 340; 248/489, 71, 73, 250

[56] References Cited

U.S. PATENT DOCUMENTS

| | | | |
|---|---|---|---|
| 2,033,100 | 3/1936 | Kellogg | 411/72 |
| 2,555,420 | 6/1951 | Richardson | 411/72 |
| 3,188,905 | 6/1965 | Millet | 411/57 |
| 3,431,813 | 3/1969 | Johnson | 411/71 |
| 3,765,634 | 10/1973 | Stemple | 248/250 |
| 4,022,100 | 5/1977 | Johnson | 411/57 |
| 4,124,189 | 11/1978 | Einhorn | 248/489 |
| 4,264,047 | 4/1981 | Nelson | 248/73 |
| 4,274,324 | 6/1981 | Giannuzzi | 411/38 |
| 4,312,614 | 1/1982 | Palmer et al. | 411/41 |
| 4,361,099 | 11/1982 | Kokenge et al. | 248/250 |

FOREIGN PATENT DOCUMENTS

| | | | |
|---|---|---|---|
| 90240 | 4/1961 | Denmark | 24/543 |
| 4919 | 3/1893 | United Kingdom | 411/394 |
| 1226 | 1/1910 | United Kingdom | 411/394 |
| 1299592 | 12/1972 | United Kingdom | 248/71 |

Primary Examiner—James L. Ridgill, Jr.
Attorney, Agent, or Firm—Rogers, Howell, Moore & Haferkamp

[57] ABSTRACT

An adjustable back clip for mounting a shelf to a wall comprising a clip body and a drive pin. A hook member on the body receives a shelf wire. A stop is hinged to the body by an internal short plastic strap and is pivotable to block the open side of the hook member and to hide the head of the drive pin. Notches on the end of the stop reduce the width of the stop end and can receive a cross wire of a shelf. A wall anchor is integral with the clip body and has fingers laterally expandable when the drive pin is driven through the anchor. The fingers have transverse wall portions engageable by the drive pin to swing the fingers to substantially ninety degree angles to the axis of the drive pin and anchor. A web is in front of the transverse wall portions in the path of the drive pin.

10 Claims, 7 Drawing Figures

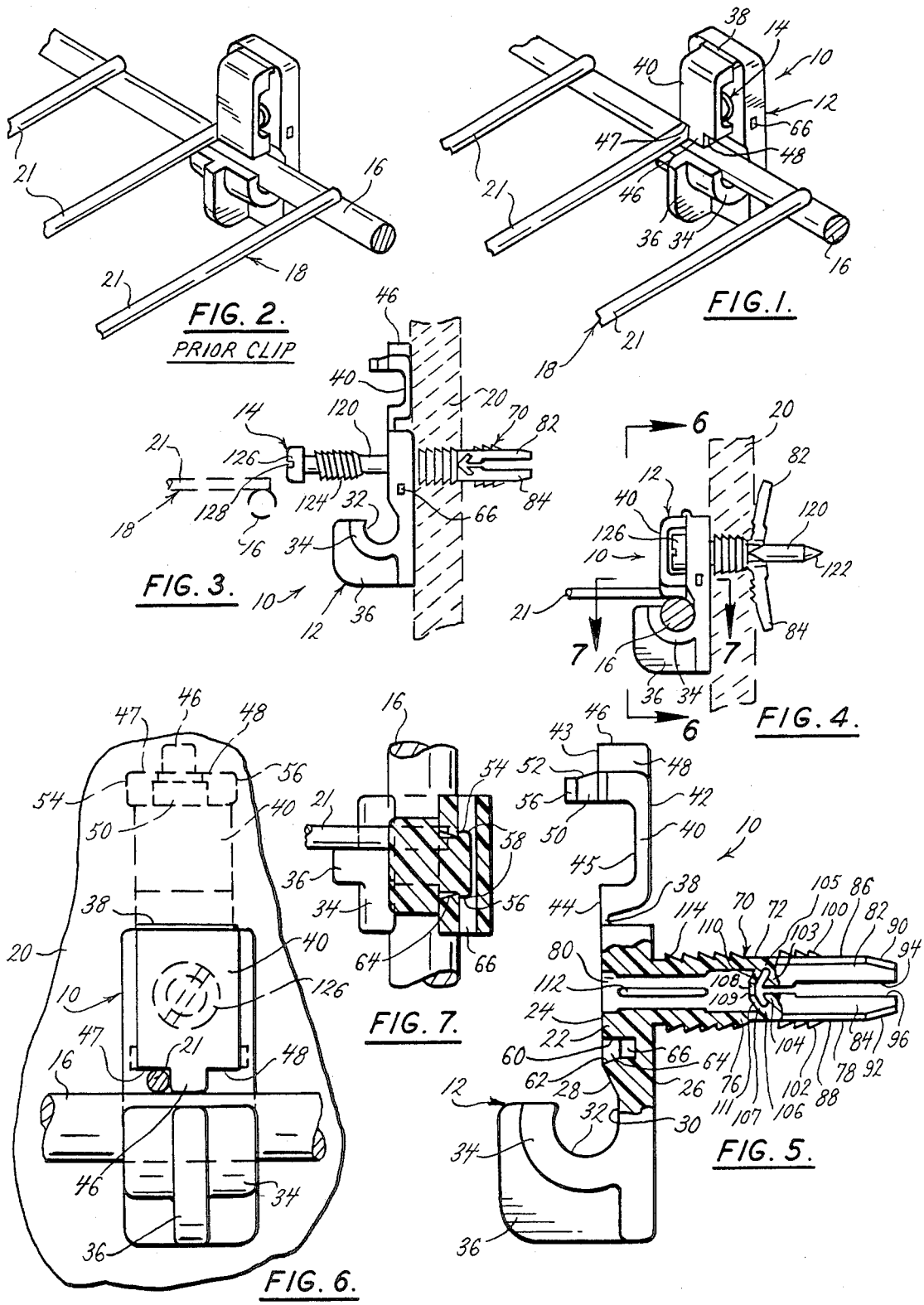

ADJUSTABLE BACK CLIP

BACKGROUND AND SUMMARY OF THE INVENTION

This application is a continuation-in-part of U.S patent application Ser. No. 783,158, filed Oct. 2, 1985 now U.S. Pat. No. 4,669,936 issued June 2, 1987. This parent application discloses a back clip for connecting an edge of a shelf to a wall. The present invention relates to a construction that minimizes interference between the back clip and cross members on the shelf.

Shelving and hardware for installing the shelving have been popular for user installation. Typical of this shelving is a shelf having a back rod extending the length of the shelf and regularly spaced parallel cross wires or rods at right angles to the back rod. The cross wires have rear ends joined to the upper side of the back rod, by welding if the components are metal, as is usual. An example of this kind of shelf is shown in FIG. 1 of U.S. Pat. No. 4,361,099. The cross wires are fairly close together so they will support articles on them, and even relatively small articles will not fall between the cross wires.

Devices for attaching shelves to walls are numerous in form and configuration and include clips of molded plastic and having a body with a wall anchor extending from it and with a wire engaging hook formed in it. In some of the existing devices, the wall anchor is of the kind having laterally expandable fingers that are expanded against the back side of a wall when a pin is extended through the wall anchor. Prior art is exemplified by U.S. Pat. Nos. 4,361,099; 4,124,189; 4,264,047; 4,312,614; 4,274,324; 4,022,100; 3,188,905; 3,431,813; 2,033,100; and 2,555,420; and by British Pat. Nos. 1,299,592; 4,919; and 1,226.

A common problem with existing back clips, including the kind described in the parent of the present application and the kind described in U.S. Pat. No. 4,361,099, is that the back clip interferes with the cross wires. In other words, after the back clip is installed on a wall, it turns out to be in the path of a cross wire. This problem occurs frequently since the user installer is usually inexperienced and tends to install the back clip without prior consideration for the locations of the cross wires. Since the cross wires are fairly closely spaced (typically about one inch on centers), this interference can occur more readily.

As described in the parent of this application, this back clip comprises a unitary molded plastic clip body and a stell drive pin. The clip body is formed with a back section having a wall contact surface and a front surface. A wall anchor extends from the wall contact surface for fastening the back clip to a wall.

On the clip body, the lower portion of the back section is formed with a hook member that has an open side facing upwardly to receive the back rod of a shelf. A stop is joined to the back wall by an integral thin plastic member that acts as a hinge. The stop has a projection on it with lateral flanges. It also has a recess in it. The back section has a specially designed recess for receiving the projection on the stop. Therefore, when the stop is pivoted downwardly about its hinge, the recess in the stop will receive the head of the pin. The length of the stop is such that, when locked in place with the projection in the recess, the stop is positioned across the open side of the hook member. In this position, the stop positively blocks release of the shelf wire from the hook member and at the same time covers the head of the drive pin.

In the back clip of the parent of this application, the stop is generally as wide as the hook member. Therefore, although the cross wires of the shelf are above the hook member and therefore always free from interference with the hook member, they can often interfere with the stop and prevent it from being pivoted downwardly. Because the back clip is significantly wide (about ½ inch) relative to the span between cross wires, this interference has occurred frequently. The present invention solves this problem by providing notches or recesses on opposite sides of the stop. These notches or recesses allow the stop to clear a cross wire that otherwise would have prevented pivoting the stop downwardly into its locked position.

Preferably, the wall anchor has a body section with rings on it. Laterally expandable fingers are joined to the rear of the body section by thin plastic connectors that act as hinges. The body section is molded with the fingers straight and together. Therefore, it is not necessary to squeeze the fingers together to insert them into a pre-drilled hole in a wall. The laterally expandable fingers include transverse wall portions in the path of a passage through the body section so that when a drive pin is driven through the body section, its lead end will contact the transverse walls and, through a camming action, spread the fingers into laterally extending positions, and hold them there.

The transverse walls are preferably inclined inwardly and toward the head of the socket so that the pin will pivot the fingers as far outwardly as possible toward ninety degre projections relative to the axis of the passage.

There is a web slightly spaced from the transverse walls with a small opening through the web, such as a slit. Without the web, a stress line would be formed during molding, the end of the core forming the passage where that core intersects the transverse walls. By providing the web, the location of the stress line is moved to the intersection of the core and the web, and the walls joining the web and the transverse walls can be formed rounded with no stress lines. This avoids failure at the pivot lines of the fingers that might result from stress lines.

The web performs another function. As the drive pin is driven through the passage, it first contacts the web and, because the slit is parallel to the pivot lines of the fingers, the pin will split the web and pivot its halves toward the fingers. Thereafter, when the pin cams the fingers outwardly, the web halves lie against the pin and present edges opposing a tendency of the transverse walls to slide back along the pin. The rings on the body section are sawtooth in side view to enable the body section to be pressed into a hole in a wall but the forward-facing edges of the rings are substantially radial to the body so that they resist removal of the wall anchor from the hole in the wall to a maximum degree.

BRIEF DESCRIPTION OF THE DRAWINGS

FIG. 1 is a perspective view of the clip of this invention, showing installation of a shelf;

FIG. 2 is a perspective view of a clip of the parent of this application, showing installation of a shelf;

FIG. 3 is a side elevation view of the back clip partially installed on a wall with a portion of a shelf shown in dolled lines;

FIG. 4 is a side elevation view of the back clip as installed on a wall;

FIG. 5 is an enlarged side elevation view of the back clip with parts shown in section;

FIG. 6 is an enlarged front elevation view of the back clip in the locked position taken on the plane of the line 6—6 of FIG. 4, with dotted lines showing the stop in the open portion; and FIG. 7 is an enlarged top plan view in section through the recess in the clip body taken along the plane of the line 7—7 in FIG. 4.

DETAILED DESCRIPTION OF THE PREFERRED EMBODIMENT

Referring to the drawings, and particularly to FIGS. 1 and 3, this back clip 10 comprises a clip body 12 and a drive pin 14 that cooperate to support a back rod 16 of a shelf 18 to a wall 20. The shelf 18 is of the kind that has a plurality of parallel, evenly spaced smaller cross wires 21 to define a horizontal support upon installation of the shelf. These cross wires 21 are typically about one inch on centers.

The clip body 12 comprises a unitary plastic member that includes a back section 22 having a front face 24 and a rear face 26. Below its center, the front face 24 has a span 28 that is inclined downwardly and rearwardly, terminating in a short vertical wall 30. The wall 30 leads to a radial hook face 32 formed in a hook extension 34 that projects forwardly from the back section 22. Preferably a central reinforcing web 36 is molded to and extends between the underside of the hook member 34 and the lower portion of the back section 22. For strength, the hook extension is typically about ½ inch wide.

A short thin plastic member 38 extends upwardly from the top of the back wall 22 and connects the back wall 22 to a stop 40. The stop 40 has an outer surface 42 and opposite thereto, coplanar inner surfaces 43 and 44 that are spaced from one another by a recessed section 45. The recessed section 45 is slightly larger than the head of the drive pin 14.

It will be noted that the thin plastic member 38 normally holds the stop 40 in the upright position shown in FIGS. 1, 3 and 5. However, the plastic member 38 is bendable and serves as a hinge allowing the stop to be pivoted to the position shown in FIG. 4. It also should be observed that the plastic member 38 may be set back slightly from the faces 24 and 46. This allows these faces to make contact in the locked position of FIG. 4 without bending the plastic member 38 too sharply.

The stop 40 has an end 46 that closes the upper side of the hook 32 when the stop is in the closed position shown in FIG. 4. Although the stop is about ½ inch wide, like the hook member 34, the end 46 is only about one-third that width because of two corner notches 47 and 48 on opposite sides of the end 46. Each corner notch, 47 and 48, is large enough to receive a cross wire, as shown in FIGS. 1 and 4, when the stop is in its locked position.

Extending from the face 43, there is a projection 50 having a tapered wall 52 and having laterally extending flanges 54 and 56 (see FIG. 7). Preferably, the leading edges 58 of the projection 50 are rounded.

In the face 24 of the back section 22, there is a recess 60, with an inclined wall 62, complementary to the projection 50 and its inclined face 52. The recess also has tapered side walls 64 that make entrance to the recess easier (see FIG. 7). To accommodate the lateral flanges 54 and 56, another recess 66 communicates with the recess 60. For ease of molding, as known in the art, the recess 66 extends between and opens through the sides of the back wall 22. The span between the projections 54 and 56 is greater than the narrowest width of the recess 60, so the projections will snap into the transverse recess 66.

Integrally molded to and extending from the back wall 22 is a wall anchor 70. The wall anchor 70 comprises a socket 72 that cooperates with the drive pin 14.

The socket 72 includes a body section 76, and a finger section 78. There is a passage 80 through the body section 76 communicating with the finger section 78. The finger section 78 includes two fingers 82 and 84 having flat outer surfaces 86 and 88, respectively, terminating in tapered nose sections 90 and 92 at the lead end of the socket 72. Inwardly, the fingers 82 and 84 have opposed flat faces 94 and 96. Toward their trailing ends, the fingers 82 and 84 have barbs 100 and 102, respectively, that are sawtooth in side elevation as shown in FIG. 3.

The fingers 82 and 84 are formed with transverse walls 103 and 104 that extend across the passage 80 through the body section 76. Preferably, these walls 103 and 104 are inclined inwardly and toward the entrance to the passage 80 at angles of about 60°, to the axis of the passage 80. Immediately adjacent the walls 103 and 104, there are short hinge sections 105 and 106 molded as integral parts of the plastic socket 72 of generally the same thickness as that of the wall of the body section 76 of the socket. Spaced from the walls 103 and 104, a web 107 is formed integral with the socket 72. A slit across the width of the web 107 parallel to the faces 94 and 96 has opposed edges 108 and 109. The slit separates the web into halves 110 and 111 which are generally parallel to the walls 103 and 104. Although the intersection of the passage 80 and the web 107 can have stress lines, because of the presence of the web 107, the short hinge sections 105 and 106 can be unstressed and even rounded.

Referring to the body section 76, a pourality of longitudinally extending ribs 112 project inwardly on the inner wall of the passage 80. The primary purpose of these ribs 112 is to grip the shank of the drive pin 14 holding the pin 14 in a ready condition. In other words, the circumscribed internal diameter defined by the ribs 112 is slightly less than the diameter of the shank of the drive pin 14.

On the outer surface of the body section 76, there are a plurality of rings 114 that are generally sawtooth in side elevation. The outer diameters of the rings 114 are essentially the same as the span between the barbs 100 and 102 so that both the fingers 82 and 84 and the body section 76 of the socket 72 will fit in the same size hole in a wall 20.

In its preferred form, the drive pin 14 has a shank 120 with a point 122 on its lead end that can be round or pointed as a typical nail point. Generally, the lead section of the shank 120 is cylindrical like a nail, whereas the trailing section is formed with a double helix thread 124. The double helix thread 124 is sawtooth in side elevation so that the drive pin 14 can be driven, such as by a hammer, into a wall and can be rotated to withdraw it. For both of these purposes, there is a head 126 on the trailing end of the drive pin 14 with a screwdriver kerf or phillips head slot 128 in it. The diameter of the cylindrical shank 120 is about equal to the internal diameter of the passage 80, whereas the outer diameter of the helical threads 124 is greater than the diameter of the passage 80. Therefore, when the drive pin 14 is started into the passage 80 and pressed within the longitudinal ribs 112, the ribs 112 will grip the pin 14 and hold it in place. Because the socket 72 is plastic, it will yield, and the pin can be inserted manually.

OPERATION AND USE

It will be apparent that before the shelf 18 can be installed, an appropriate number of back clips 10 must be installed. Frequently, those back clips are installed without first noting the locations of the cross wires 21.

The drive pin 14 is pressed into the passage 80 until the leading portion of the shank 120 is pressed within the area of the ribs 11. These ribs 12 will hold the drive pin 14 in place. A hole should be drilled in the wall 20 of a diameter slightly greater than the diameter of the body of the socket 72, and less than the diameter of the rings 76. The socket 72 can then be pushed into the hole in the wall (the fingers not having to be squeezed together), and the rings 114 will hold it in place temporarily (see FIG. 3). Now, a hammer can drive against the head 126 of the drive pin 14. As the drive pin 14 extends into the socket 80, it engages the transverse walls 103 and 104 of the fingers 82 and 84 and pivots the fingers toward the ninety degree orientations shown in FIG. 4. The web halves 110 and 111 are now stretched along the shank 120 of the pin 74, placing their edges 108 and 109 in positions to help hold the fingers 82 and 84 in their spread positions. The barbs 100 and 102 gripo the wall surface as shown in FIG. 4.

After the wall clip is installed on a wall, the shelf unit 18 can be set in place with the wire 16 resting on the hook surface 32. Since the normal position of the stop 40 is upwardly projecting, it stands out of the way of interference with the introduction of the wire 16 into the hook 32. Thereafter, using manual pressure, such as by a thumb, the stop 40 can be pivoted toward the position shown in FIG. 4. As the stop 40 approaches that position, the projection 50 will enter the recess 60. Because of the tapered side walls 64, the flanges 54 and 56 enter the recess 60 readily. As the side walls 64 narrow, the resistanc increases, but the plastic yields and allows the flanges 54 and 56 to snap into the recess 66. This positively locks the stop 40 in the position shown in FIGS. 4 and 7. In this position, the end 46 of the stop overlies the opening of the hook 32 and blocks escape of the wire 16. In addition, the head 126 of the drive pin 14 is received within the recess 48 and is covered from view by the stop 40.

Because of the notches 47 and 48 on opposite sides of the end 46, the cross wires will almost never interfere with closing the stop 40. As shown in FIG. 6, if a cross wire 21 is in the area, it will be received in one of the notches 47 or 48. Even if a cross wire is directly in the path of the end 46 of the stop 40, normally slight pivoting of the back clip about the drive pin 14 will cause the end 46 to clear that cross wire 21.

One of the advantages of the construction of this back clip is that the lock provided by the projection 50 and the recess 60 is independent of the end 46 of the stop 40. This allows the end 46 to be narrow without weakening that lock. Since the end 46 is only a retainer against upward movement of the back rod 16, its narrow configuration pursuant to this invention does not interfere with its function.

Should it be desired to remove the shelf and wall clip, the stop 40 can be pried to free the projection 50 and its lateral flanges 54 and 56 from the recesses 66 and 60.

Then the shelf rod 16 can be lifted from the hook 32. Thereafter, the drive pin 14 can be rotated by a screwdriver in a direction that will cause the threads 124 to withdraw the drive pin from the socket 72. Once the drive pin has cleared the faces or walls 103 and 104 of the fingers 82 and 84, they can pivot back to the straight positions shown in FIG. 3, and the socket 72 can be withdrawn from the hole in the wall.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A self and a back clip to support the shelf from a wall, the shelf having a back rod with an upper side and having a plurality of parallel, uniformly spaced cross wires generally normal to the back rod and with ends joined to the upper side of the back rod, the back clip comprising an integral plastic member having a clip body, means to attach the clip body to the wall, a hook formed as an integral part of the clip body, the hook being narrower than the span between adjacent cross wires and having an open upwardly facing side for receiving the shelf back rod, a stop, an end formed on the stop, hinge means joining the stop to the clip body at a point spaced from the open side of the hook and enabling the stop to pivot about the hinge means from a first position away from the hook to a second position toward the hook with the end of the stop positioned adjacent the open side of the hook, means for locking the step in the second position, and notch means adjacent the stop end, the notch means being sized to receive one of the cross wires, the width of the step being less than and at least one-third the span between adjacent cross wires, and the width of the end of the stop adjacent the notch means being less than half the width of the stop to substantially reduce the width of the step end and thereby substantially reduce the potential for interference between the stop end and a cross wire.

2. The back clip of claim 1 wherein the notch means comprises two notches on opposite sides of the stop and each notch is sized to receive a one of the cross wires.

3. The back clip of claim 1 wherein the means to attach the clip body to a mounting surface includes a pin extending through the clip body at a point between the hinge means and the recess, a head on the pin, the stop being at least as wide as the head whereby the stop obscures the head when the stop is in the second position the notch means being spaced from the head.

4. The back clip of claim 1 including a projection on the stop, a recess in the clip body complementary in size and shape to the projection to receive the projection and lock the stop in the second position obstructing the open side of the hook.

5. The back clip of claim 4 wherein the recess has an entrance with tapered side walls converging in a direction away from the entrance and terminating at an enlarged area of the recess, and wherein the projection has lateral flanges, the span between the lateral flanges being greater than the narrowest span between the side walls and being less than the widest span between the side walls, the enlarged area of the recess being wide enough to receive the lateral flanges.

6. The back clip of claim 1 wherein the clip body has a face adapted to rest against the mounting surface, a tubular member integral with the body and extending from the face, a passage through the tubular member, a pair of fingers extending from the end of the tubular member, the pin extending through the passage, the head on the pin being larger than the diameter of the passage to limit extension of the pin into the passage, the pin being longer than the tubular member so that it projects between the fingers when the head contacts the clip body, the span of the area between the fingers being less than the diameter of the pin so that the fingers are spread upon entry of the pin into the area between the fingers.

7. The back clip of claim 6 wherein the fingers have walls in the path of the pin and including a web in the passage between the clip body and the walls of the fingers, the web being integral with the socket.

8. The back clip of claim 7 including a slit in the web, the web extending generally across the passage and being joined to a circumference of the passage.

9. The back clip of claim 7 wherein the portions generally parallel to the walls of the fingers.

10. The back clip of claim 7 wherein the web is spaced from the walls of the fingers.

* * * * *